Nov. 8, 1938.　　　　G. C. PAXTON　　　　2,135,838
CONTINUOUS TRANSVERSE ROLLER FRUIT CONVEYER
Filed Jan. 28, 1936　　　2 Sheets-Sheet 1
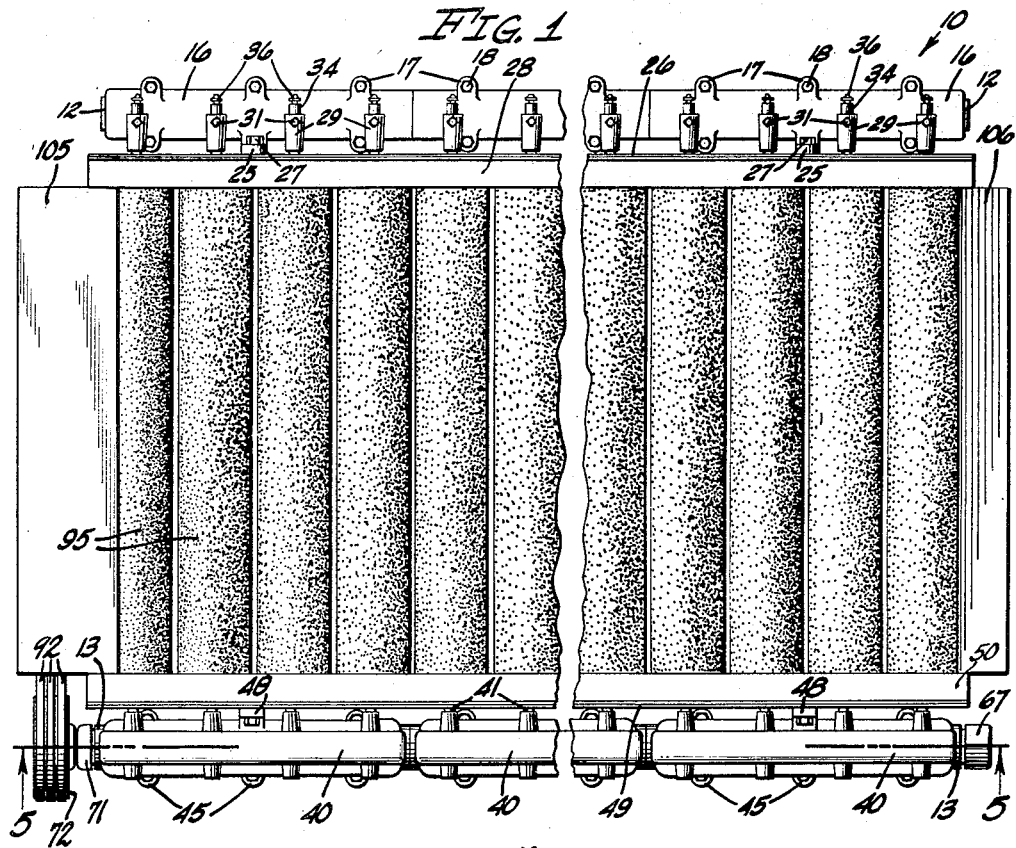
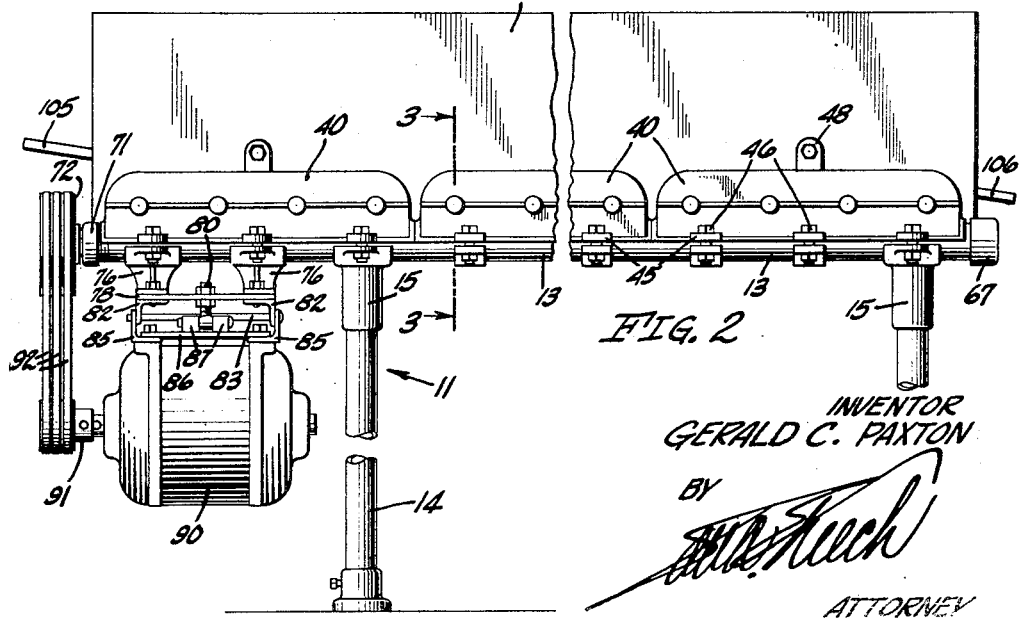

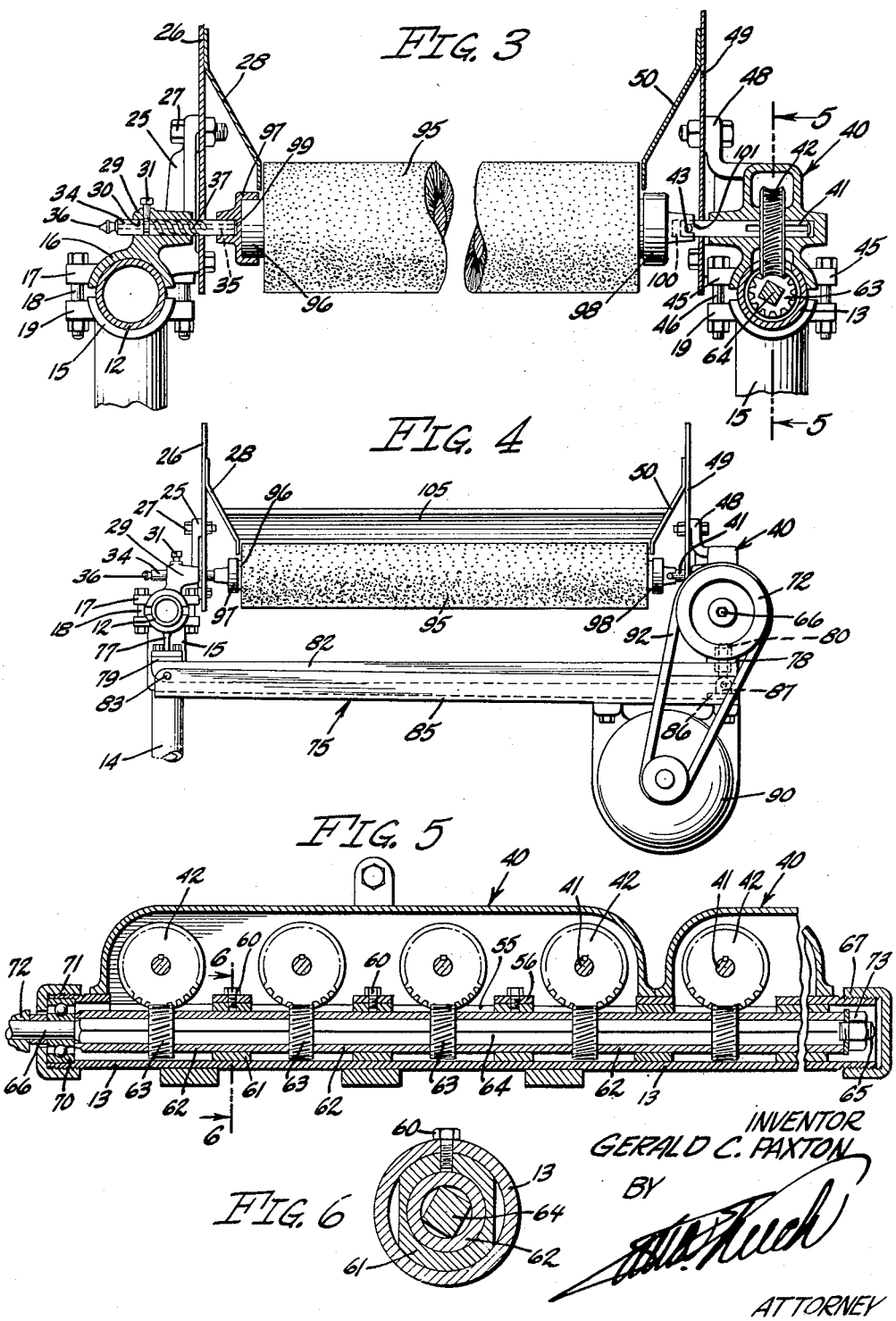

Patented Nov. 8, 1938

2,135,838

UNITED STATES PATENT OFFICE 2,135,838

CONTINUOUS TRANSVERSE ROLLER FRUIT CONVEYER

Gerald C. Paxton, Santa Ana, Calif., assignor, by mesne assignments, to Food Machinery Corporation, a corporation of Delaware Application January 28, 1936, Serial No. 61,183

20 Claims. (Cl. 198—127)

In preparing for market fresh, whole fruit having rollable characteristics, the fruit must be washed, dried, and in some cases polished before being graded and placed in shipping cases for transportation to the market. In passing through the various steps of its treatment, the fruit is generally carried on continuous transverse roller fruit conveyers. In some cases the rolls of these conveyers are formed with hard, smooth surfaces. In other cases the rolls are surfaced with rubber, and in still other instances the rolls are formed of brush material so as to brush the fruit while it rests upon the rolls. Regardless of the exact nature of the rolls themselves, however, a means must be provided in these conveyers for rotating each of the rolls about a fixed axis. In the past the best means provided for accomplishing the rotation of these rolls have been noisy and unreliable in operation.

It is an object of my invention to provide a transverse roller fruit conveyer having an improved roller driving mechanism.

Further objects of my invention are to provide such a transverse roller fruit conveyer wherein the roller drive mechanism will be practically noiseless; wherein such mechanism will have a long working life; wherein an opportunity will be given to readily replace worn parts in such mechanism; wherein said mechanism may be easily disassembled and reassembled in making repairs; wherein lubrication of said mechanism may be effected over a long period of time with relatively slight attention thereto; and wherein the rollers of said conveyer may be readily removed therefrom and repaired or replaced by new rollers without more than a very brief interruption of the operation of the conveyer.

The manner of accomplishing the foregoing objects, as well as further objects and advantages, will be made manifest in the following description taken in connection with the accompanying drawings, in which:

Fig. 1 is a plan view of a preferred embodiment of my invention;

Fig. 2 is a front elevational view of the conveyer shown in Fig. 1;

Fig. 3 is an enlarged cross sectional view of the conveyer illustrated in Figs. 1 and 2, taken on the line 3—3 of Fig. 2;

Fig. 4 is an end elevational view of the conveyer at the power end thereof, illustrating the mounting of the electric drive motor;

Fig. 5 is an enlarged vertical sectional view taken on the line 5—5 of Fig. 1, and illustrating the construction of the gear boxes and gears of the drive mechanism of my invention;

Fig. 6 is an enlarged cross sectional detail view taken on the line 6—6 of Fig. 5 and illustrating the construction of the drive shaft bearings and drive shaft of my invention.

Referring specifically to the drawings, the preferred embodiment of my invention illustrated therein comprises a transverse roller conveyer 10 having a base frame 11 which consists mainly of an idle side pipe 12 and a drive side pipe 13, both of which are supported by pipe legs 14 having head members 15 in which the aforesaid frame pipes 12 and 13 nest as shown in Figs. 2 and 3.

Embracing the upper surface of the pipe 12 is a series of idle roller end supporting caps 16 which are provided with lugs 17 which are connected by bolts 18 to lugs 19 on the head member 15 and to suitable clamp members disposed therebeneath so as to rigidly clamp head member 15 and the support 16 onto the pipe 12. Formed integrally with each of the caps 16 and extending upwardly therefrom is a wall support 25 upon which a sheet metal wall 26 is supported by bolts 27. Each of the caps 16 has a plurality of idle shaft supports 29 having a horizontal bore 30 and a set screw 31 threadedly received in an aperture in the head 29 and extending downwardly therethrough into the bore 30. Disposed in the bore 30 is an idle roller shaft 34 which is provided with a lubricating aperture 35 to which lubricant may be supplied through a nozzle fitting 36. The shaft 34 is provided with a relatively deep external thread 37 into which the lower end of the set screw 31 is adapted to extend to limit the movement of the shaft 34 in the support head 29 to a helical or screwing action.

Resting on top of the pipe 13 and making a non-leaking engagement therewith is a series of driven gear and shaft housings 40 which house and provide bearings for driven shafts 41 and driven gears 42 mounted on said shafts. Each of the shafts 41 extends out from the housing 40 into the interior of the machine and has a pin 43, the purpose of which will be made manifest hereinafter. Each housing 40 is provided with lugs 45, certain pairs of which are connected by bolts 46 with the lugs 19 of head members 15 disposed therebeneath. Extending upwardly from each housing 40 is a wall supporting arm 48 which supports a sheet metal wall 49 having an inner apron 50.

The pipe 13 is provided with openings 55 separated by bridges 56, there being one of the openings 55 opposite each of the driven gears 42 so that said driven gear extends downwardly into said opening 55 when the housings 40 rest upon the pipe 13. Positioned in the pipe 13 under each of the bridges 56 by cap screws 60 is a bearing sleeve 61. Adapted to journal in each of the bearing sleeves 61 is a shaft sleeve 62 and disposed between each adjacent pair of shaft sleeves 62 is a drive gear 63. Extending through the bearing sleeves 61 and the driving gears 63 is a square shaft 64 having rounded and threaded portions 65 and 66 at opposite ends. The pipe 13 has a cap 67 completely covering one end thereof and at this end a nut 73 is screwed onto the shaft end 65 and tightly bears against the endmost shaft sleeve 62.

Mounted on the end 66 of the shaft 64 is a ball bearing 70 retained within the adjacent end of the pipe 13 by a cap 71 as shown in Fig. 5. The end 66 of shaft 64 extends through an aperture provided on the cap 71, and a pulley 72 shown in Fig. 4 is fixed on the shaft end 66.

Mounted on the underside of the conveyer 10 at one end thereof is a motor support and belt tightening unit 75 shown in Figs. 2 and 4. The unit 75 includes a pair of brackets 76 bolted on the underside of the pipe 13 as seen in Fig. 2 and a similar pair of brackets 77 mounted on the underside of the pipe 12. On the lower ends of the brackets 76 and 77 are bars 78 and 79, respectively, the bar 78 being apertured to receive the threaded end of an eye bolt 80.

Bolted at their ends on the underside of the bars 78 and 79 are angle iron bars 82 apertured to receive a pin 83. Swingably mounted on the pin 83 below the angle bars 82 is a pair of angle bars 85, the free ends of the latter being joined by a bar 86 upon which are lugs 87, a suitable pin extending through the lugs 87 and the apertured end of the eye bolt 80. Fixed on the underside of the angle bars 85 is a motor 90 having a pulley 91 thereon, the latter being aligned with the pulley 72. Trained about the pulleys 72 and 91 is a plurality of V-belts 92.

Mounted between each pair of the shafts 34 and 41 is a roller 95 which is preferably in the form of a cylindrical brush having a core 96 as shown in Fig. 3. Fixed on opposite ends of the cores 96 are adapters 97 and 98, the adapter 97 having a socket 99 for rotatably receiving the innermost end of the shaft 34. The adapter 98 is formed to provide a socket 100 for receiving the end of the driven shaft 41, notches 101 being formed on the adapter 98 for receiving the pin 43 of the shaft 41.

The non-leaking engagement referred to hereinbefore between the pipe 13 and the housings 40 covers the area on the pipe 13 occupied by the openings or holes 55 so that any leakage of lubricant outwardly from between these housings and this pipe is prevented. The holes 55 of course communicate between the space within the pipe 13 and the spaces within the housings 40 and the lubricant used in lubricating the bearings in which the shaft sleeves 62 rotate and in lubricating the gears 42 and 63 flows freely back and forth between the space within the pipe 13 and the spaces within the housings 40. Owing to the non-leaking engagement between the housings 40 and the pipe 13 circumscribing the areas in which the openings 55 are located the interior spaces of the pipe 13 and the housings 40 may be packed with grease to afford constant lubrication to the working parts of the drive mechanism.

Operation

When the motor 90 is energized the belts 92 drive the shaft 64, causing the brushes 95 to be rotated in the same direction at equal speeds by means of the pairs of gears 42 and 63. Fruit (not shown) is fed onto a suitable drop board 105 and rolls onto the upper surfaces of the rollers 95 and tends to remain in the valleys formed between the adjacent rollers. Oncoming fruit displaces fruit from one valley into the next valley, causing the fruit to be eventually carried through the conveyer 10 and discharged onto an outlet drop board 106.

Although I have shown brushing elements 95 in connection with my invention, it is to be understood that any other form of cylindrical roller might be substituted therefor.

When it is necessary to remove one or more of the rollers 95 for repairs or replacement, the set screw 31 is loosened and the shaft 34 is rotated until the innermost end thereof is drawn out of the adapter 97 by engagement of the thread 37 with the lower end of the screw 31. When the shaft 34 is withdrawn from the socket 99, the left end of the element 95 (as viewed in Fig. 3) is free to be lowered and simultaneously moved leftward to withdraw the adapter 98 from the shaft 41 thus completely removing the roller 95 from the conveyer 10.

The rollers 95 are replaced in the conveyer 10 by reversing the procedure followed in removing these as above described.

Any of the bearings 61, spacers 62, or gears 63 may be removed from the pipe 13 in the following manner: The housings 40 are loosened and removed from the pipe 13 and the cap 67 is removed from the end of the pipe 13 to permit removal of the nut 73. The cap 71 is then unscrewed from the opposite end of the pipe 13. By grasping the pulley 72 the shaft 64 may now be withdrawn from the pipe 13, leaving the spacers 62, bearings 61, and gears 63 within the pipe 13. Anyone of the gears 63, spacers 62, or bearings 61 may be removed through the openings 55 and replaced in the same manner.

After the replacement of the parts within the pipe 13, the shaft 64 is slid into position and assembled by reversing the process above described as followed in removing the shaft 64.

Although I have shown and described but one preferred form of my invention, it is to be understood that various modifications and changes might be made therein, without departing from the spirit of the invention or the scope of the appended claims.

What I claim is:

1. In combination: a frame; a multiple group of parallel rollers; means on said frame for pivotally supporting ends of said rollers along one edge of said group; a series of shafts having driving engagement with the ends of said rollers at the opposite edge of said group; driven gears provided on said shafts; housing means enclosing said gears and said shafts and providing bearings for the latter; a pipe; spaced bearings provided in said pipe; drive gears disposed between said pipe bearings; drive shaft means extending through said drive gears and said pipe bearings and having a driving connection with the former and journalling in the latter; and means for assembling said pipe and said housing means to form a non-leaking engagement therebetween, there being openings in said housing means and said pipe located within the area of said non-leaking engagement, through which openings a meshing engagement between said drive gears and said driven gears is effected when said housing means and said pipe are assembled as aforesaid.

2. A combination as in claim 1 in which said main drive shaft bearings are capable of removal from said pipe through the aforesaid openings in said pipe.

3. A combination as in claim 1 in which said drive shaft means comprises a series of spacer sleeves which are disposed between and space said drive gears, and rotate in said pipe bearings, and a shaft extending through said sleeves and said drive gears.

4. A combination as in claim 1 in which said drive shaft means comprises a series of bearing spacer sleeves which are disposed between and space said drive gears, and a shaft extending through said sleeves and said drive gears, and means utilizing said last mentioned shaft to bind said drive gears and sleeves together.

5. In combination: a pair of longitudinal, parallel spaced frame pipes, one of these being an idle pipe and the other a drive housing pipe; legs for supporting said pipes; a multiple group of parallel rollers; means on said idle pipe for pivotally supporting ends of said rollers along one edge of said group; a series of shafts having driving engagement with the ends of said rollers at the opposite edge of said group; driven gears provided on said shafts; housing means enclosing said gears and said shafts and providing bearings for the latter; spaced bearings provided in said drive pipe; drive gears disposed between said pipe bearings; drive shaft means extending through said drive gears and said pipe bearings and having a driving connection with the former and journalling in the latter; and means for assembling said drive housing pipe and said housing means to form a sealing engagement therebetween, there being openings in said housing means and said drive housing pipe located within the area of said sealing engagement, through which openings a meshing engagement between said drive gears and said driven gears is effected when said housing means and said drive housing pipe are assembled as aforesaid.

6. A combination as in claim 5 in which said main drive shaft bearings are capable of removal from said drive housing pipe through the aforesaid openings in said pipe.

7. A combination as in claim 5 in which said drive shaft means comprises a series of spacer sleeves which are disposed between and space said drive gears and rotate in said pipe bearings, and a shaft extending through said sleeves and said drive gears.

8. A combination as in claim 5 in which said housing means is assembled upon said frame drive pipe by a series of clamps, said drive pipe lying beneath said housing means, and in which said legs are provided with cap pieces operating as one of the aforesaid clamps in the aforesaid assembling operation.

9. A combination as in claim 5 in which the aforesaid shaft means is provided with a pulley and is driven by a belt encircling said pulley and the drive pulley of a motor, said motor being suspended on a motor frame extending across the device and pivotally supported from the aforesaid idle pipe.

10. In combination: a cylindrical tube of uniform diameter, there being a plurality of holes in the wall of said tube; bearings adapted to be inserted in said tube through said holes; means for retaining said bearings in said tube between said holes; drive gears adapted to be disposed in said tube opposite said holes; drive shaft means extending into said tube, said means supporting and driving said gears and journalling in said bearings; a plurality of driven gears; a housing for enclosing and rotatably mounting said driven gears, said housing having a concave cylindrical surface for mating with the convex cylindrical surface of said tube and making a non-leaking engagement therewith, said engagement bringing said gears into meshing relationship through said holes; and means to securely clamp said housing to said tube to maintain said engagement.

11. In combination: a cylindrical tube of uniform diameter, there being a plurality of holes in the wall of said tube; bearings adapted to fit within said tube; means for retaining said bearings in said tube between said holes; drive gears adapted to be disposed in said tube opposite said holes; drive shaft means extending into said tube, said means supporting and driving said gears and journalling in said bearings; a plurality of driven gears; a housing for enclosing and rotatably mounting said driven gears, said housing having a concave cylindrical surface for mating with the convex cylindrical surface of said tube and making a non-leaking engagement therewith, said engagement bringing said gears into meshing relationship through said holes; and means to securely clamp said housing to said tube to maintain said engagement.

12. In combination: a tube having a plurality of holes in the wall thereof; bearings adapted to be inserted in said tube through said holes; means for retaining said bearings in said tube between said holes; drive gears adapted to be disposed in said tube opposite said holes; drive shaft means extending into said tube, said means supporting and driving said gears and journalling in said bearings; a plurality of driven gears; a housing for enclosing and rotatably mounting said driven gears; and clamping means for securely clamping said housing upon said tube to bring said driven gears into meshing relation with said drive gears through said holes.

13. A combination as in claim 11 in which said bearings support said shaft means and drive gears co-axially with said tube.

14. In a shaft and gear assembly, the combination of: a plurality of gears; a plurality of bearings; means for mounting said bearings in spaced relation and in alignment; a shaft of angular cross section; there being holes centrally formed in said gears to receive said shaft, the shape of said shaft preventing rotation of said gears relative to said shaft, said shaft extending through said bearings and said gears with the latter interspersed between said bearings; and a plurality of shaft sleeves surrounding said shaft, spacing said gears and journalling in said bearings.

15. In a shaft and gear assembly, the combination of: a plurality of gears; a plurality of bearings; means for mounting said bearings in spaced relation and in alignment; a shaft of angular cross section, there being holes centrally formed in said gears to receive said shaft, the shape of said shaft preventing rotation of said gears relative to said shaft, said shaft extending through said bearings and said gears with the latter interspersed between said bearings; a plurality of shaft sleeves surrounding said shaft, spacing said gears and journalling in said bearings; and means for clamping said sleeves and gears together on said shaft so that these rotate substantially as a unit.

16. In a shaft and gear assembly, the combination of: a plurality of gears; a plurality of bearings; means for mounting said bearings in spaced relation and in alignment; a shaft of angular cross section, there being holes centrally formed in said gears to receive said shaft, the shape of said shaft preventing rotation of said gears relative to said shaft, said shaft extending through said bearings and said gears with the latter interspersed between said bearings; a plurality of shaft sleeves surrounding said shaft, spacing said gears and journalling in said bearings; and means on said shaft for utilizing the latter as a tension member to bind together said gears and said sleeves so that said gears, said sleeves and said shaft rotate as a single unit.

17. In a shaft and gear assembly, the combination of: a frame tube, there being holes provided at spaced intervals in said tube; a plurality of bearing sleeves adapted to fit inside said tube; means for positioning said bearing sleeves in said tube between said holes; a plurality of shaft sleeves journalling in said bearing sleeves; a plurality of gears interspersed between said shaft sleeves, said gears having non-circular holes provided centrally therein; and a shaft of angular cross section extending through and fitting said shaft sleeves and gears to support said shaft in said sleeves and support said gears on said shaft and provide a drive connection between said shaft and said gears with said shaft, gears, and shaft sleeves rotatable as a unit about a single axis.

18. In a shaft and gear assembly, the combination of: a frame tube, there being holes provided at spaced intervals in said tube; a plurality of bearing sleeves adapted to fit inside said tube; means for positioning said bearing sleeves in said tube between said holes; a plurality of shaft sleeves journalling in said bearing sleeves; a plurality of gears interspersed between said shaft sleeves, said gears having non-circular holes provided centrally therein; and a shaft of angular cross section extending through and fitting said shaft sleeves and gears to support said shaft in said sleeves and support said gears on said shaft and provide a drive connection between said shaft and said gears with said shaft, gears, and shaft sleeves rotatable as a unit about a single axis; and means on said shaft for utilizing the latter as a tension member to bind together said gears and said shaft sleeves as a rotational unit.

19. In a shaft and gear assembly, the combination of: a frame tube having a plurality of holes; a plurality of bearing sleeves adapted to fit into said tube; means for positioning said bearing sleeves in said tube between said holes; a plurality of shaft sleeves journalling in said bearing sleeves; a plurality of gears interspersed between said shaft sleeves; and means for binding said gears and said shaft sleeves together as a rotational unit.

20. In a shaft and gear assembly, the combination of: a frame tube having a plurality of holes; a plurality of bearing sleeves adapted to fit into said tube; means for positioning said bearing sleeves in said tube between said holes; a plurality of shaft sleeves journalling in said bearing sleeves; a plurality of gears interspersed between said shaft sleeves; and tension means extending through said shaft sleeves and said gears for binding together said shaft sleeves and said gears as a single rotational unit.

GERALD C. PAXTON.